United States Patent
Gilmore

(10) Patent No.: US 6,851,637 B2
(45) Date of Patent: Feb. 8, 2005

(54) VARIABLE USE FLY-FISHING REEL

(76) Inventor: David F. Gilmore, P.O. Box 266, Perkinsville, VT (US) 05151

( * ) Notice: Subject to any disclaimer, the term of this patent is extended or adjusted under 35 U.S.C. 154(b) by 0 days.

(21) Appl. No.: 10/446,949

(22) Filed: May 28, 2003

(65) Prior Publication Data

US 2004/0061011 A1 Apr. 1, 2004

Related U.S. Application Data

(60) Provisional application No. 60/415,448, filed on Oct. 1, 2002.

(51) Int. Cl.[7] .............................................. A01K 89/105
(52) U.S. Cl. ...................... 242/318; 318/317; 318/295; 318/303; 318/322; 318/270; 318/282
(58) Field of Search ................................ 242/317, 318, 242/295, 302, 303, 306, 282, 321, 322, 270

(56) References Cited

U.S. PATENT DOCUMENTS

| | | | |
|---|---|---|---|
| 2,142,967 A | 1/1939 | Russell ...................... 242/84.1 |
| 2,858,998 A * | 11/1958 | Nadolskey .................. 242/303 |
| 3,510,083 A | 5/1970 | Cook ........................ 242/84.51 |
| 3,591,107 A * | 7/1971 | Ferguson .................... 242/299 |
| 3,765,618 A * | 10/1973 | Johnson et al. ............. 242/317 |
| 4,461,435 A * | 7/1984 | Kovalovsky ................. 242/258 |
| 4,606,512 A | 8/1986 | Dennison ............... 242/84.2 C |
| 4,728,054 A * | 3/1988 | Pisapio ....................... 242/258 |
| 4,750,687 A | 6/1988 | Sievert et al. .............. 242/218 |
| 4,883,238 A * | 11/1989 | Harder ....................... 242/317 |
| 5,120,003 A | 6/1992 | Sacconi ....................... 242/317 |
| 5,407,144 A | 4/1995 | Ryall .......................... 242/295 |
| 5,542,619 A * | 8/1996 | Karlsson ..................... 242/289 |
| 5,590,847 A * | 1/1997 | Ament ........................ 242/317 |
| 5,609,309 A | 3/1997 | Oh ............................. 242/282 |
| 5,755,391 A | 5/1998 | Sacconi ....................... 242/312 |
| 5,947,398 A * | 9/1999 | Yeh ............................. 242/295 |
| 6,065,699 A * | 5/2000 | Sacconi ....................... 242/286 |
| 6,073,871 A | 6/2000 | Farris et al. ................ 242/295 |
| 6,155,508 A | 12/2000 | Lepage ....................... 242/303 |
| 6,193,182 B1 * | 2/2001 | Capra .......................... 242/292 |
| 6,206,312 B1 | 3/2001 | Oh ............................. 242/314 |
| 6,286,772 B1 | 9/2001 | Koelewyn ................... 242/246 |
| 6,550,709 B2 * | 4/2003 | Vashro ........................ 242/295 |

* cited by examiner

Primary Examiner—Eileen D. Lillis
Assistant Examiner—Evan H Langdon
(74) Attorney, Agent, or Firm—Michael J. Weins; Jeffrey E. Semprebon

(57) ABSTRACT

A fly-fishing reel has a reel body with a reversible pawl and an arbor. A spindle shaft with a gear rotates on the arbor, the gear and pawl limiting the direction of rotation. A spool and lockably engaged drive plate rotate on the spindle shaft and are secured thereon by a drag capsule which attaches to the spindle shaft. Tightening the drag capsule on the spindle shaft forcibly engages friction surfaces on the spindle shaft, the spool, the drive plate, and the drag capsule to provide an adjustable dual disk drag mechanism, as well as securing the drive plate and spool together. The spool can be readily replaced with a different spool and the spools are preferably reversible on the spindle shaft. A winding handle is attached to the drive plate to provide direct-drive action, or is attached to the drag capsule to provide a non-return action.

14 Claims, 8 Drawing Sheets

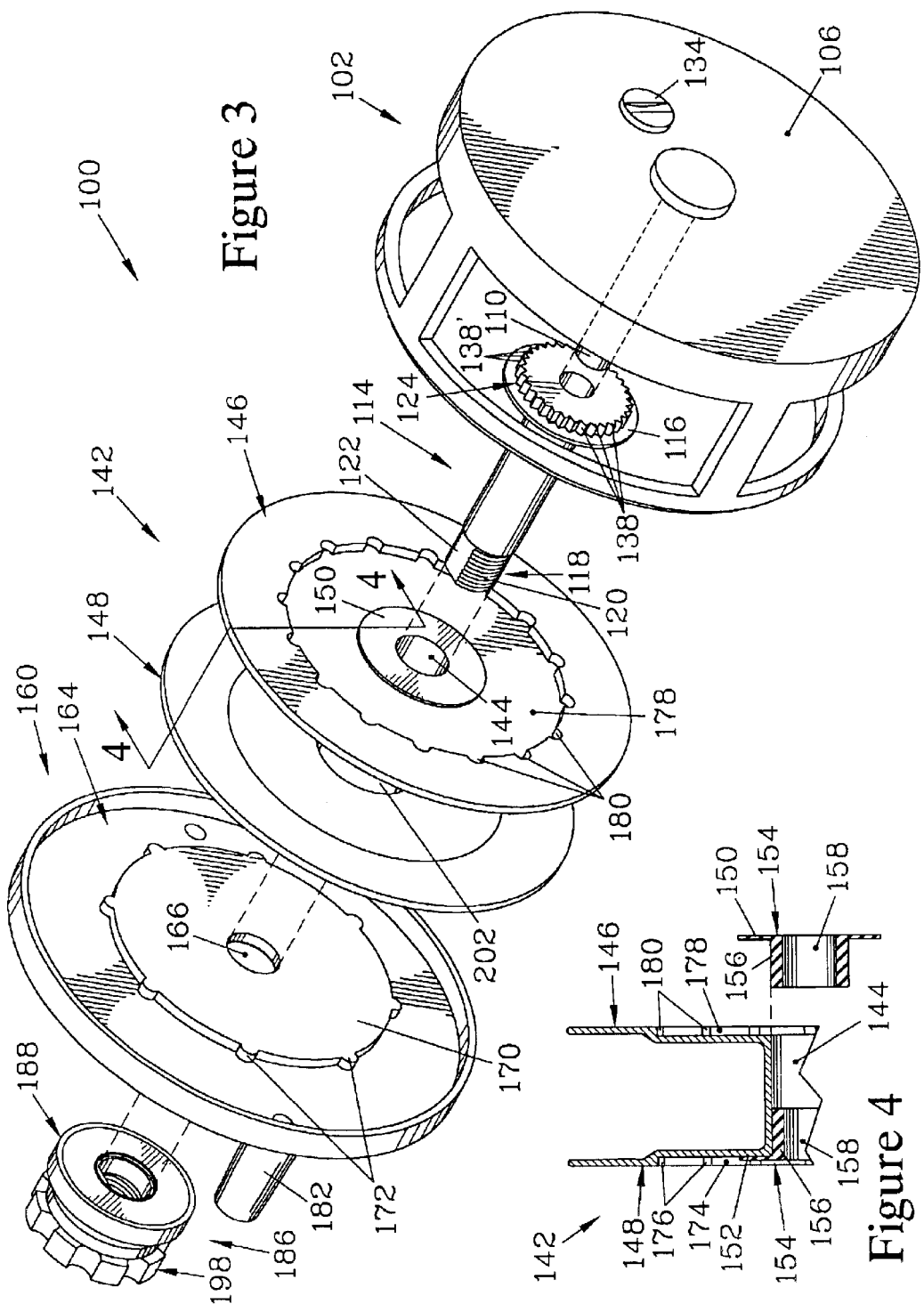

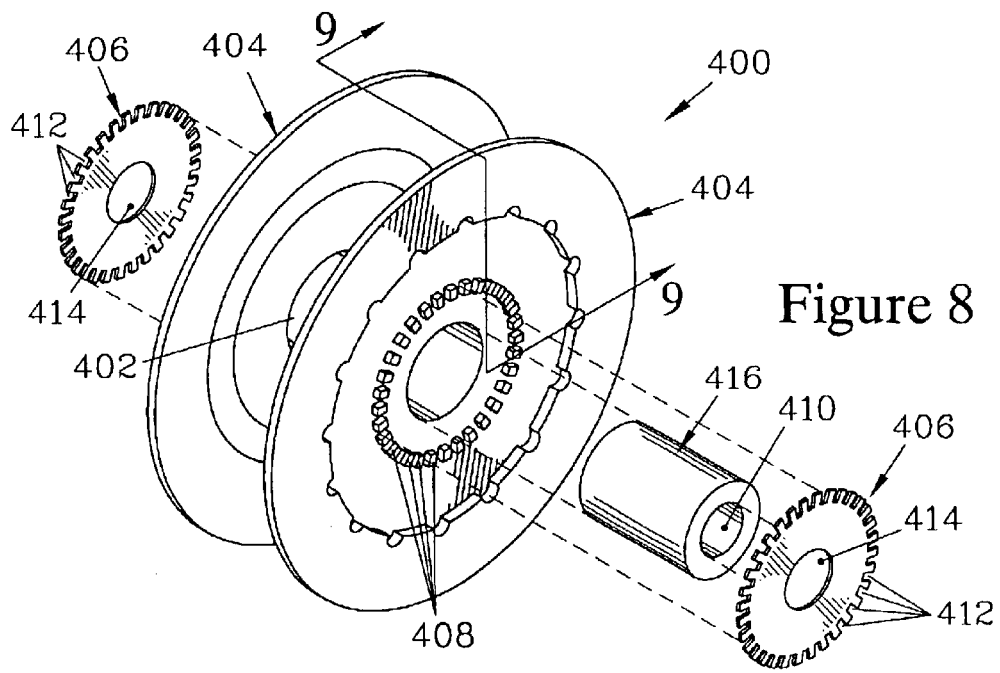
Figure 8
Figure 9
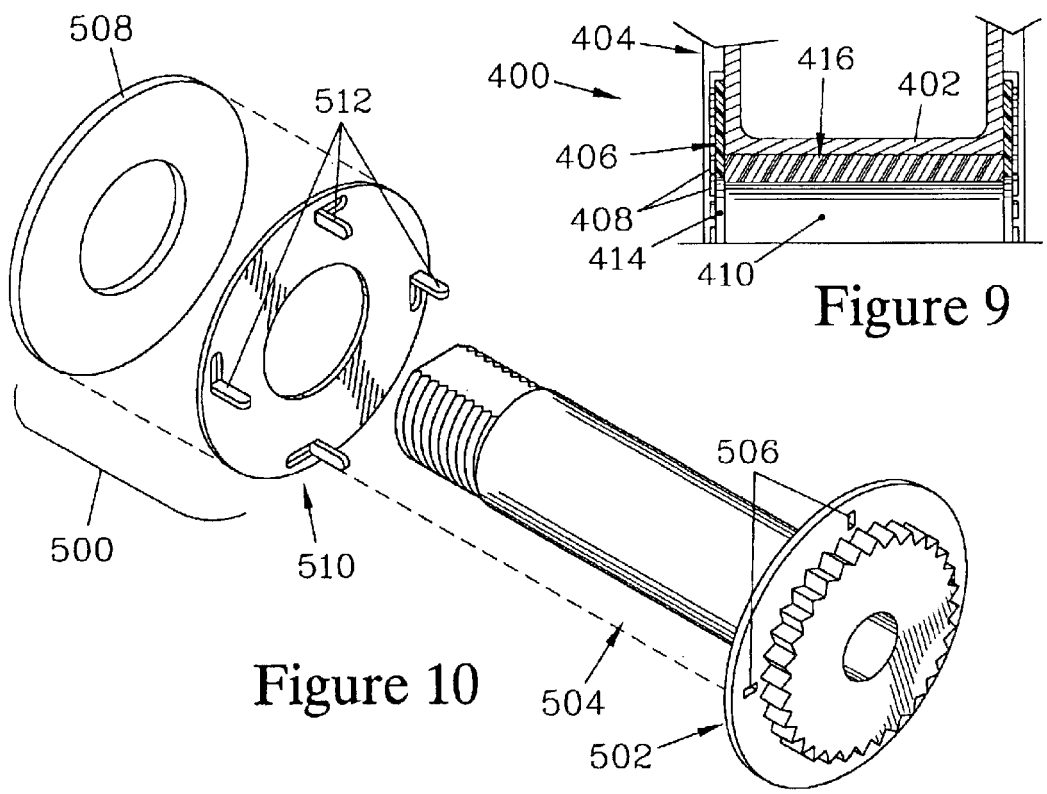
Figure 10

VARIABLE USE FLY-FISHING REEL

FIELD OF THE INVENTION

The present invention is for a fishing reel suitable for fly-fishing, and more specifically for a fishing reel which allows an operator to readily change spools while providing a double disk drag action for smoother operation. The fishing reel of the present invention can preferably also allow a user to change the operating characteristics of the reel to suit various applications.

BACKGROUND OF THE INVENTION

Fishing reels attach to a fishing pole and serve to handle a fishing line which is wound onto a spool of the reel. The reel allows the user to wind line onto the spool to retrieve the line after it has been cast and to bring in a fish hooked to the line, and allows a fish hooked onto the line to "run" with the line, in which the fish unwinds line from the reel under a frictional drag force which tires the fish. In fly-fishing, presentation of the baited hook attached to the line is critical, and thus the weight of the line must be properly suited to the conditions and the size range of the fish to be caught. Thus, as fishing conditions vary, it is desirable to change the line which is employed.

Classically, fly-fishing reels employ spools which have a plate on one side to which a winding handle is mounted. The spool is readily detachable from the remainder of the reel, and supplemental spool and plate assemblies can be employed to allow changing the fishing line without unwinding the line and mounting a new line to the spool. This approach has been found costly, as the supplemental spool and plate assemblies are relatively expensive. This problem is increased for fishing guides who may need to accommodate both left-handed and right-handed clients, as the guide must either provide duplicate spools wound for left- and right-handed use, or must spend considerable time unwinding and rewinding the line on the spool.

U.S. Pat. No. 5,120,003 attempts to overcome the limitations of classic fly-fishing reels by providing a reel where a single spool and plate assembly can be readily disassembled to allow a selected cartridge of line to be mounted thereon. Replacing the cartridge with another allows changing the weight of the line, and the cartridge can be reversed on the spool and plate assembly to switch between left- and right-handed use.

While the '003 patent overcomes the requirement to employ multiple spools and plate assemblies, changing from one line to another requires detaching the spool and plate assembly from the reel, then disassembling the spool and plate assembly to change the cartridge of line. This process requires manipulating a large number of separate parts, creating a risk of dropping one or more parts while attempting to change the line. To overcome this problem, U.S. Pat. No. 5,755,391 teaches a spool and plate assembly where the cartridge locks onto the plate to form the spool and plate assembly, which can subsequently be attached to the remainder of the reel. While the reel of the '391 patent appears to reduce the problems of changing line weight and switching between left- and right-handed use, changing the cartridge of the '391 reel requires the manipulation of small elements which may be difficult if the user is wearing gloves or has reduced dexterity due to cold or other environmental conditions. Furthermore, fishing reels are frequently subject to harsh use, such as being dropped in sand, and in both of these reels removal of such sand is frequently difficult due to the intricate structure of the reels.

In addition to the difficulties which occur when changing line cartridges, another limitation of the reels of the '003 and '391 patents is that these spools cannot be used with reels having a dual disk drag system, but rather are used with reels having conventional single-disk drag mechanisms, where drag on the spool is applied from only one side, limiting performance. A further limitation is that both reels are limited to a "direct drive" mode of operation where the handle turns with the spool, since the winding handle is mounted to the plate attached to the spool. This can create problems when larger, more powerful fish are hooked, since such fish can "run" with the line at high speeds, causing the spool, plate, and attached winding handle to turn at high speed and creating a risk of damage and/or injury from impact of the handle with surrounding objects.

Thus, there is a need for a fishing reel with an alternative structure to allow readily changing line weight and switching between left- and right-handed use without requiring a high degree of dexterity, and preferably overcoming other shortcomings of the reels discussed above.

SUMMARY OF THE INVENTION

The present invention is for a fishing reel having particular utility for fly-fishing. The fishing reel, which can be either a full cage or a partial cage reel, has a reel body suitable for mounting to a fishing pole. The reel body has a base plate, on which are mounted a pawl assembly and a reel arbor. The reel arbor is centrally mounted on the reel body and extends therefrom. A spindle shaft terminating in a spindle flange and a free end is provided and configured to rotatably engage the reel arbor. The free end of the spindle shaft preferably has a threaded portion.

A gear is fixably attached to the spindle flange and axially aligned with the spindle shaft. The pawl assembly is positioned on the base plate to operably engage the gear so as to allow rotation of the spindle shaft in a first direction while preventing rotation of the spindle shaft in a second direction that is opposite the first direction. The first direction is the line retrieving direction, while the second direction is the line running direction.

A flange friction washer surrounds the spindle shaft and is fixably attached with respect to the spindle flange. One preferred material for the flange friction washer is a composite material having cork particles in a rubber matrix, which provides a combination of sliding resistance and elasticity, making the material well suited for a friction washer. Preferably, a washer mounting ring is provided for attachment of the flange friction washer to the spindle flange. The washer mounting ring in turn is lockably engaged with the flange.

A spool for holding the fishing line is supported by the spindle shaft, which in turn is mounted on the reel arbor. The spool has a spool first end and a spool second end, and a spool central passage therethrough. The spool central passage is configured to slide over and rotate about the spindle shaft. The spool first end has a spool first end friction surface which surrounds the spool central passage and which slidably engages the flange friction washer when the spool central passage is engaged with the spindle shaft. In one preferred embodiment, the spool first end friction surface is provided by an attached first end disk, which is preferably fabricated from a self-lubricating material such as a graphite-impregnated polymer. The first end disk can be provided with a sleeve configured to reside in and serve as a portion of the spool central passage. The sleeve is configured to slidably and rotatably engage the spindle shaft.

When the first end disk and sleeve are fabricated from a self-lubricating material, the sleeve provides a lubricated bearing and assures that the spool can freely rotate with respect to the spindle shaft. However, many of the self-lubricating materials suitable for this purpose tend to swell when immersed in salt water, and thus can cause binding between the spool and the spindle. Thus, it is still further preferred to employ a separate friction disk and sleeve, the sleeve being configured to reside in the spool central passage and serve as a bearing. It is still further preferred for the spool first end to be provided with protrusions disposed about the spool central passage and to employ sheet stock for the friction disk, which is configured to interlock with the protrusions so as to provide a readily replaceable friction disk.

A drive plate is provided, having a plate free side and a spool-engaging side which engages the spool. The drive plate has a plate central passage therethrough, sized to allow the spindle shaft to pass therethrough. The plate free side is fitted with a plate friction washer, preferably of the same material as the flange friction washer. The plate friction washer surrounds the plate central passage. As with the flange friction washer, it is preferred to employ a washer mounting ring to which the plate friction washer is attached, the washer mounting ring in turn lockably engaging the drive plate.

Means for lockably engaging the drive plate to the spool are provided. One effective means is to configure the spool-engaging side and the spool second end to slidably but not rotatably engage each other. This locking engagement between the spool-engaging side and the spool second end can be provided by one or more protrusions on one of these elements which mate with corresponding depressions, into which the protrusions slidably engage, on the other of these elements. In one preferred embodiment, the protrusions are provided on the drive spool-engaging side and the recesses are provided on the spool second end.

A drag capsule is provided, which attaches to the free end of the spindle shaft and, when so attached, secures the spool between the spindle flange and the drive plate. The drag capsule has a drag capsule base having a drag capsule base passage therethrough, terminated at one end by a drag capsule friction surface, which surrounds the drag capsule base passage. The drag capsule friction surface is provided for mating with the plate friction washer. The drag capsule base passage is configured to adjustably engage the spindle shaft free end and means for advancing the drag capsule base on the spindle shaft so as to forcibly engage the drag capsule friction surface with the plate friction washer are provided. To prevent the drag capsule from being worked off the spindle shaft, means for affixing the drag capsule to the spindle shaft so as to maintain the drag capsule friction surface in forced engagement with the plate friction washer are also provided.

One preferred means for advancing the drag capsule base on the spindle shaft so as to forcibly engage the drag capsule friction surface with the plate friction washer is provided by a threaded surface on the drag capsule which threadably engages the threaded portion of the free end of the spindle shaft. The drag capsule can thus be tightened onto the spindle shaft, generating a compression force which forcibly engages the drag capsule friction surface with the plate friction washer. Once so positioned, a locknut can serve as means for affixing the drag capsule to the spindle shaft to maintain the drag capsule friction surface in forced engagement with the plate friction washer. The compression force is also transmitted by the drive plate and the spool to the spool first end friction surface, so that the spool first end friction surface forcibly engages the flange friction washer which resides on the spindle flange. The drag capsule, being so configured, allows a user to vary the frictional force between the drag capsule base and the drive plate and between the spool first end and the flange friction washer by adjusting the position of the drag capsule on the spindle shaft. Since the spindle shaft and the drag capsule mounted thereto are prevented from rotating in the second direction by the pawl, rotation of the spool and the drive plate in the second direction is resisted only by this frictional engagement, and thus this adjustment allows the user to set a desired amount of drag for rotation of the spool in the second direction.

A preferred embodiment has a drag capsule base having the drag capsule base passage configured to slidably engage the free end of the spindle shaft. The base passage is provided with at least one keyway which is configured to mate with at least one key provided on the spindle shaft free end to prevent rotation of the drag capsule base with respect to the spindle shaft. In this embodiment, the drag capsule is also provided with a drag capsule cap which has a cap threaded surface which threadably engages the threaded portion of the free end of the spindle shaft to provide the means for advancing the drag capsule base on the spindle shaft so as to forcibly engage the drag capsule friction surface with the plate friction washer. Since rotation of the drag capsule base with respect to the spindle shaft is prevented, the drag capsule cap is isolated from torques to prevent loosening of the drag capsule during operation, and thus the keyway in combination with the drag capsule cap provides the means for affixing the drag capsule to the spindle shaft to maintain the drag capsule friction surface in forced engagement with the plate friction washer.

It is further preferred that a spacer be provided between the drag capsule base and the drag capsule cap to connect these elements, and that at least one of the connections between the spacer and the drag capsule base and between the spacer and the drag capsule cap be a rotatable connection. It is further preferred that either the spacer be formed of a resilient material such as an elastomer, or that a wave spring be included to provide resiliency when a substantially rigid spacer is employed. The compressibility of the resilient spacer or the wave spring allows finer adjustment of the pressure exerted on the friction washers, thereby enhancing the sensitivity of the drag adjustment, while connecting the drag capsule base and the drag capsule cap together reduces the number of separate parts when the fishing reel is disassembled. When the drag capsule is formed with the drag capsule base connected to the drag capsule cap, the fishing reel can be readily disassembled into four relatively large parts for cleaning and for removing any dirt, sand, or other debris. To reduce the likelihood of cross-threading and avoid inadvertently dropping the drag capsule when loosening it from the spindle shaft, it has been found preferable to provide means for snappably engaging the drag capsule with the spindle shaft in advance of threadably engaging the spindle shaft.

A handle is operatively connected to the drive plate to allow the user to rotate the spool in at least the first direction. The handle can be directly connected to the drive plate, when the reel is to operate in a "direct drive" mode, where the motion of the handle is bi-directional and follows the motion of the spool. Alternatively, when the drag capsule base is prevented from rotating with respect to the spindle shaft free end, the handle can be connected to the drag capsule base, in which case the motion of the handle is limited to the first direction to provide a "non-return" mode of operation for the reel. In this case, the handle is prevented from rotating in the second direction by the action of the pawl, which prevents rotation of the spindle shaft, to which the drag capsule base is non-rotatably mounted, in the second direction.

Since the mode of operation is determined by the configuration of the drive plate and the drag capsule, a supplemental drive plate and an associated drag capsule can be provided to allow a user to select between either the "direct drive" mode or the "non-return" mode simply by employing the drive plate and drag capsule for the desired mode of operation.

When the reel is designed to allow switching between left- and right-handed operation without requiring the rewinding of the line on the spool, additional elements are required. For such operation, the pawl assembly is a bi-positional assembly which allows selectively positioning the pawl assembly with respect to the base plate between a first pawl assembly position, where the pawl assembly allows rotation of the spindle shaft in the first direction but prevents rotation of the spindle shaft in the second and opposite direction, and a second pawl assembly position, which allows rotation of the spindle shaft in the second direction while preventing rotation in the first direction.

When the spool is to be reversible, a spool second end friction surface is provided, which surrounds the spool central passage at the spool second end. The spool second end friction surface can be engaged with the flange friction washer in place of the spool first end friction surface. Again, it is preferred to employ a separate friction disk and, in this case, the sleeve is configured to reside in the spool central passage and extend to the friction disks, preferably being retained thereby. It is also preferred for the friction disks to be fabricated from sheet stock and configured to grippably engage the spool first end and the spool second end. Also provided are means for lockably engaging the spool-engaging side with the spool first end. When recesses on the spool second end are employed, identical recesses can be employed on the spool first end. With these additional changes, the reel can be readily reversed on the spindle shaft to convert the reel from a left-handed mode of operation to a right-handed mode without requiring the line to be rewound onto the spool.

Independently of whether the spool is reversible, supplemental spools can be provided which are configured to slidably and rotatably engage the spindle shaft and lockably engage the drive plate in place of the original spool. These supplemental spools allow a user to readily switch between different weights of fishing lines and/or to switch between a small arbor spool, allowing a greater length of line to be carried, and a large arbor spool, allowing greater mechanical advantage when retrieving the line.

BRIEF DESCRIPTION OF THE FIGURES

FIG. 2 shows the reel with a winding handle in the foreground. The fly-fishing reel is again a self-lubricating reel, with a full cage case and employing a double disk drag for balanced smooth action. The fly-fishing reel of this embodiment again provides for ease in changing spools as well as a quick conversion from left- to right-handed operation. The fly-fishing reel as illustrated has a spool with a small spindle arbor to provide a large line capacity. The embodiment has a winding handle which rotates with the spool during both winding and unwinding of the line.

FIG. 3 is another view of the embodiment illustrated in FIG. 2. In this view, the fly-fishing reel is viewed with the winding handle in the background.

FIG. 4 is a view of the section 4—4 of FIG. 3, showing further details of the spool.

FIG. 8 is an exploded isometric view of a preferred embodiment of a spool of the present embodiment invention, which is a small arbor spool suitable for use with the reel shown in FIG. 6. The spool employs replaceable spool end friction surfaces which lockably engage ridges in the spool ends. A tubular bearing is provided which reduces the friction between the spool and a spindle shaft when the spool rotates on the spindle shaft.

FIG. 9 is an assembled partial view of the section 9—9 of FIG. 8.

FIG. 10 is an exploded isometric view of spindle shaft flange and flange friction washer assembly which employs a replaceable flange friction washer that is mounted to the spindle shaft flange via a washer mounting ring.

DETAILED DESCRIPTION OF THE PREFERRED EMBODIMENTS

Figure 1:
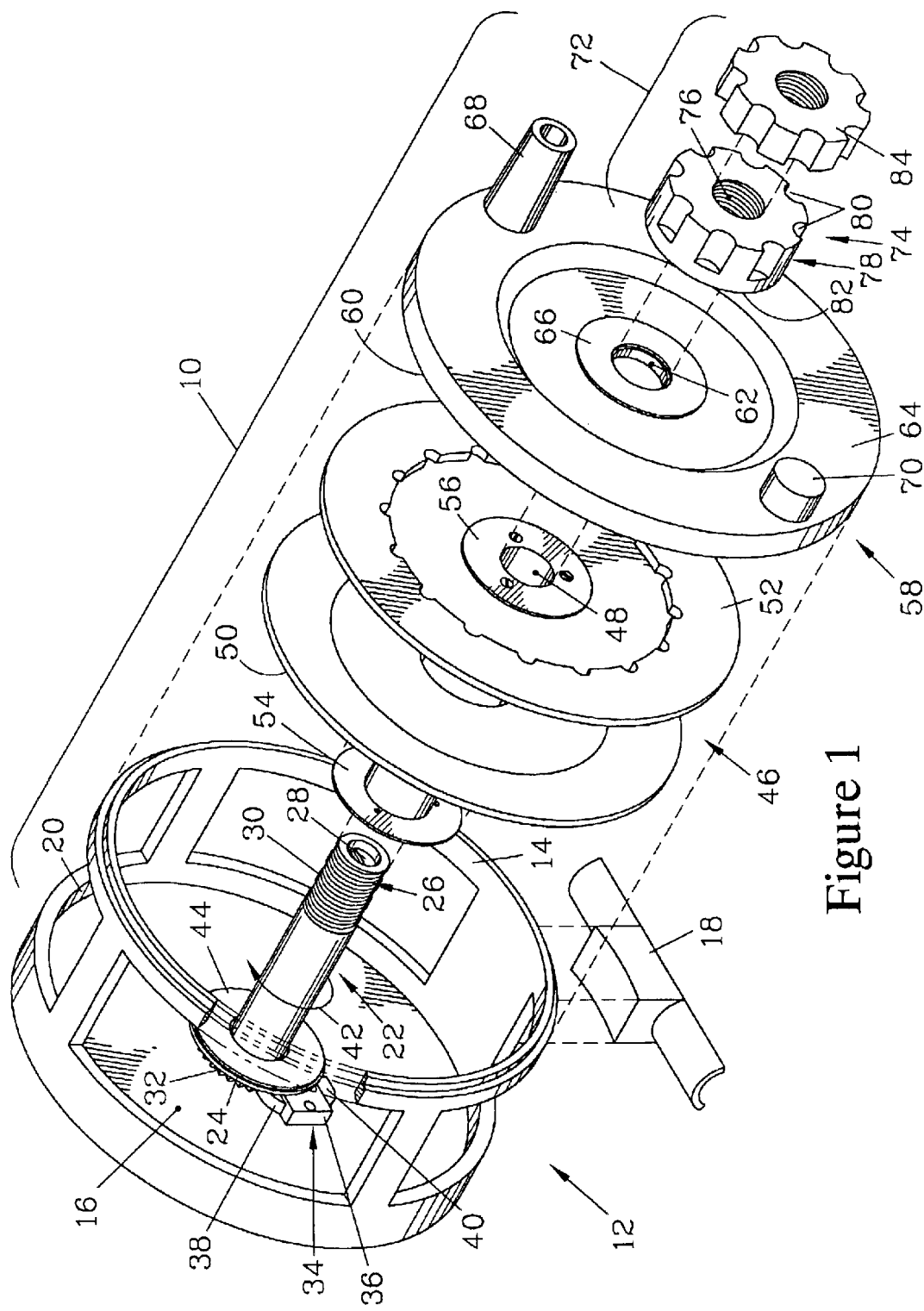
FIG. 1 is an exploded isometric view of one embodiment of a fly-fishing reel of the present invention. The view shows the reel with a winding handle in the foreground. The fly-fishing reel is a self-lubricating reel, with a full cage case and employing a double disk drag for balanced smooth action. The fly-fishing reel of this embodiment provides for ease in changing spools as well as a quick conversion from left- to right-handed operation. The fly-fishing reel as illustrated has a spool with a small spindle arbor to provide a large line capacity. The embodiment has a winding handle which rotates with the spool during both winding and unwinding of the line. A drag capsule is provided which serves to lock the spool in the case as well as to adjust the drag on the spool. The drag capsule has a nut, which threadably engages a spindle shaft and serves as a drag capsule base, and a lock nut, which serves as a drag capsule cap and serves to avoid backing off of the drag capsule base. The drag capsule base is used to adjust the drag on the spool.

FIG. 1 is an exploded isometric view of a fly-fishing reel 10 of the present invention. A reel body 12 is provided, which in the illustrated embodiment has a full cage case having a rim 14 that forms a complete circle. The reel body 12 has a base plate 16 that forms the back of the fly-fishing reel 10. The fly-fishing reel 10 is designed to be quickly and simply configured to be used either as a left-handed reel or as a right-handed reel.

The reel body 12 is mountable on a fishing pole (not shown) by a reel mount 18 attaching to the reel body 12. A reel arbor (not shown) is centrally mounted on the base plate 16 and extends therefrom. The base plate 16 is bounded by an annular wall 20, which is symmetrically disposed about the reel arbor.

A spindle shaft 22 that terminates in a spindle flange 24 and a free end 26 rotatably engages the reel arbor and is secured thereto by a screw 28 or similar fastener. The free end 26 of the spindle shaft 22 has a threaded portion 30. A gear 32 is fixably attached to the spindle flange 24 and axially aligned with the spindle shaft 22.

When the fly-fishing reel 10 is a reversible reel, a reversible pawl assembly 34 is provided and is pivotably mounted to the base plate 16 of the reel body 12. The pawl assembly 34 has a pawl base 36 having a first tine 38 and a second tine 40 attached thereto. The pawl base 36 is movable between a first position and a second position. In the first position, when the gear 32 is permitted to rotate clockwise as indicated by the arrow 42, the gear 32 and attached spindle shaft 22 rotate, since the first tine 38 is positioned so as to slide over teeth of the gear 32. If the gear 32 is urged in the opposite direction, the first tine 38 engages a face of a tooth of the gear 32 and blocks the spindle shaft 22 from rotation in the counterclockwise direction. When the pawl base 36 is moved to the second position, the second tine 40 allows the gear 32 to rotate in a counterclockwise direction while blocking clockwise rotation. The pivotable mounting of the pawl assembly 34 with dual tines (38, 40) allows the reel 10 to be converted from a left-handed reel to a right-handed reel. If the reel 10 is not to be reversible, a fixed pawl can be used to limit the direction of rotation of the spindle shaft 22. While the above described pawl assembly 34 can serve to appropriately regulate the action of the spindle shaft 22, one skilled in the art could substitute other pawl assemblies which differ in details to accomplish the same function.

A flange friction washer 44 is provided to maintain a drag on a spool 46 onto which the fishing line (not shown) is mounted. The flange friction washer 44 is configured to surround the spindle shaft 22 and is affixed to the spindle flange 24. The flange friction washer 44 should be made of a relatively soft yet gripping material. One such material which has been found to be effective is a composite of cork particles embedded in a rubber matrix.

The spool 46 has a spool central passage 48, of which at least a portion is configured to slide and rotate with respect to the spindle shaft 22. The spool 46 terminates in a spool first end 50 and a spool second end 52. The spool first end 50 is preferably configured to be closely spaced from the annular wall 20 of the reel body 12 when the spool central passage 48 is positioned over the spindle shaft 22, and has a spool first end friction surface 54 which is provided for engagement with the flange friction washer 44. When the flange friction washer 44 is made from a cork and rubber composite, it has been found that a graphite-impregnated polymer provides an effective material for the spool first end friction surface 54 to provide an even drag. Preferably, the spool 46 is reversible so that the fly-fishing reel 10 can be switched between left- and right-handed operation without requiring rewinding of the fishing line wound onto the spool 46. To allow the spool to be reversed, a spool second end friction surface 56 is provided on the spool second end 52.

The spool 46 is driven by the user via a drive plate 58 having a spool-engaging side 60 which is designed to lockably engage the spool 46 so that, when engaged, they move as a unit. The drive plate 58 has a plate central passage 62 passing therethrough. The drive plate 58 has a plate free surface 64 which is spaced apart from the spool 46 and which is provided with a plate friction washer 66 surrounding the plate central passage 62. The plate friction washer 66 preferably has a composition similar to that of the flange friction washer 44. The drive plate 58 is preferably configured to substantially cover and be closely spaced from the rim 14 of the reel body 12.

The drive plate 58 is driven by a winding handle 68 which is attached directly to the drive plate 58. A counterweight 70 is provided, and is diametrically opposed to the handle 68 to improve the balance of the drive plate 58 when rotating.

In order for the fly-fishing reel 10 to properly function, it is necessary that the plate friction washer 66 and the flange friction washer 44 be compressively loaded to generate the drag necessary to avoid backlash of the line from spinning off the spool 46 which would otherwise result from a sudden loss of line tension. This compressive load is provided by a drag capsule 72 which threadably engages the threaded portion 30 of the spindle shaft 22. As the drag capsule 72 is tightened onto the spindle shaft 22, an appropriate load is generated between the drag capsule 72 and the spindle flange 24. This load generates dual drag force on the spool 46 and the drive plate 58 engaged therewith.

The drag capsule 72 has a drag capsule base 74, which is a nut having a threaded passage 76 that is pitched to match the threaded portion 30 of the free end 26 of the spindle shaft 22. The drag capsule base 74 has a periphery 78 configured with grooves 80 so as to be readily gripped by the user to apply torque. The drag capsule base 74 has attached thereto a drag capsule friction surface 82 which is the same material as the first end friction surface 54 for engaging the plate friction washer 66. A lock nut 84 is provided as part of the drag capsule 72 and locks the drag capsule base 74 in position on the spindle shaft 22 once the drag capsule base 74 has been adjusted to provide the desired amount of drag.

It should be appreciated by one skilled in the art that the character of the materials respectively described above for providing the friction surfaces and the friction washers could be reversed without affecting the resulting action of the reel.

Figure 2:
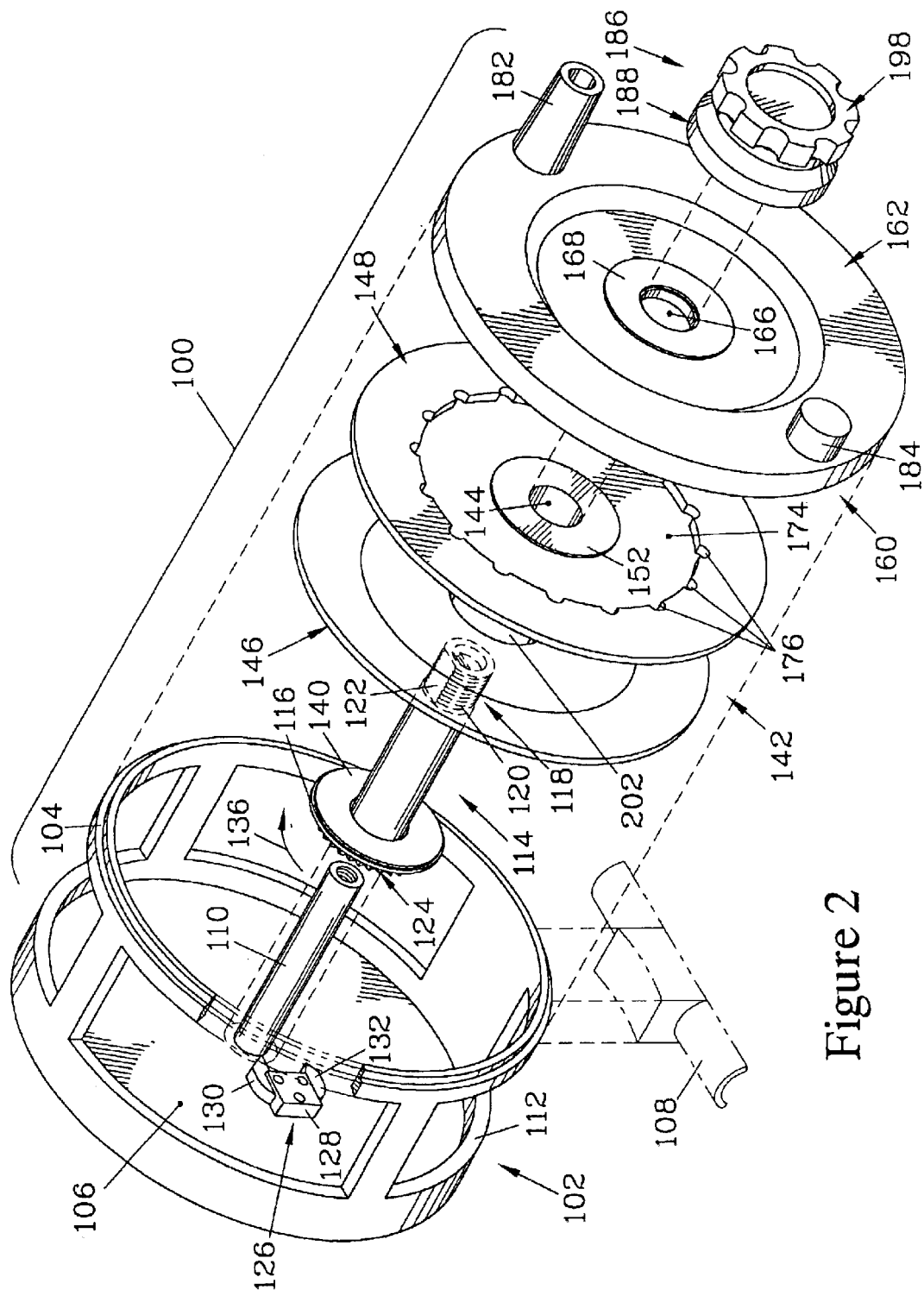
FIG. 2 is an exploded isometric view of another embodiment of a fly-fishing reel of the present invention.

FIGS. 2 and 3 are exploded isometric views of a fly-fishing reel 100 of the present invention. A reel body 102 is provided, which in the illustrated embodiment has a full cage case having a rim 104 that forms a complete circle. The reel body 102 has a base plate 106 that forms the back of the fly-fishing reel 100. FIG. 2 shows the reel with the base plate 106 in the background, while FIG. 3 shows the fly-fishing reel 100 with the base plate 106 in the foreground. The fly-fishing reel 100 is designed so to be quickly and simply configured to be used either as a left-handed reel or as a right-handed reel.

The reel body 102 is mountable on a fishing pole (not shown) by a reel mount 108 (shown in phantom in FIG. 2) attaching to the reel body 102. A reel arbor 110 is centrally mounted on the base plate 106 and extends therefrom. The base plate 106 is bounded by an annular wall 112, which is symmetrically disposed about the reel arbor 110.

A spindle shaft 114 that terminates in a spindle flange 116 and a free end 118 rotatably engages the reel arbor 110 and is secured thereto by a screw or similar fastener. The free end 118 of the spindle shaft 114 has a threaded portion 120 and a key 122, as better shown in FIGS. 3 and 5. A gear 124 is fixably attached to the spindle flange 116 and is axially aligned with the spindle shaft 114.

When the fly-fishing reel 100 is a reversible reel, as illustrated in FIGS. 2 and 3, a reversible pawl assembly 126 is provided and is pivotably mounted to the base plate 106 of the reel body 102. The pawl assembly 126 has a pawl base 128 having a first tine 130 and a second tine 132 attached thereto. The pawl base 128 is movable between a first position, as illustrated, and a second position, not shown, by a locking set screw 134 (shown in FIG. 3). In the first position, when the gear 124 is urged to rotate clockwise as indicated by the arrow 136, the gear 124 and attached spindle shaft 114 rotate, since the first tine 130 is positioned so as to slide over teeth 138 (best shown in FIGS. 3 and 5) of the gear 124. If the gear 124 is urged in the opposite direction, the first tine 130 engages a face 138' of one of the teeth 138, blocking the spindle shaft 114 from rotation in the counterclockwise direction. When the pawl base 128 is moved to the second position, the second tine 132 allows the gear 124 to rotate in a counterclockwise direction while blocking clockwise rotation. The pivotable mounting of the pawl assembly 126 with dual tines (130, 132) allows the reel 100 to be converted from a left-handed reel to a right-handed reel.

A flange friction washer 140 is provided to maintain a drag on a spool 142 onto which the fishing line (not shown) is mounted. The flange friction washer 140 is configured to surround the spindle shaft 114 and is affixed to the spindle flange 116 (the details of this structure being best shown in FIG. 5, where sections of the gear 124 and the spindle flange 116 have been cut away).

The spool 142 has a spool central passage 144, of which at least a portion is configured to slidably and rotatably engage the spindle shaft 114. The spool 142 terminates in a spool first end 146 and a spool second end 148. The spool first end 146 is preferably configured to be closely spaced from the annular wall 112 of the reel body 102 when the spool central passage 144 is engaged with the spindle shaft 114, and has a spool first end friction surface 150 (shown in FIGS. 3 and 5) which is provided for engagement with the flange friction washer 140 (shown in FIGS. 2 and 5). When the flange friction washer 140 is made from a cork and rubber composite, it has been found that a graphite-impregnated polymer provides an effective material for the spool first end friction surface 150 to provide an even drag. Preferably, the spool 142 is reversible so that the fly-fishing reel 100 can be switched between left- and right-handed operation without requiring rewinding of the fishing line wound onto the spool 142. To allow the spool to be reversed, a spool second end friction surface 152 is provided on the spool second end 148, as shown in FIG. 2.

FIG. 4 is a partial section view that illustrates one preferred configuration of the spool second end friction surface 152 and the spool first end friction surface 150 (respectively shown in FIGS. 2 and 3). In this embodiment, the friction surfaces (150 and 152) are provided by a pair of disks 154, each having a sleeve 156 extending therefrom. The sleeves 156 are each configured to extend into the spool central passage 144 and have a sleeve passage 158 that forms part of the spool central passage 144. The sleeve passages 158 are configured to slidably and rotatably engage the spindle shaft 114, assuring at least a portion of the spool central passage 144 is configured for rotating contact with the spindle shaft 114. Having a lubricating material such as graphite-impregnated polymer for the portion of the spool central passage 144 that rotatably contacts the spindle shaft 114 helps assure smooth movement of the spool 142 on the spindle shaft 114. However, when the reel 100 is intended for use in saltwater, it has been found that immersion in saltwater can cause some graphite-impregnated polymer materials to swell, which might result in binding of the spool 142 on the spindle shaft 114. In such cases, an alternative structure for providing the spool end friction surfaces (150, 152) and the spool central passage 144 should be employed. One such alternative structure is discussed below in the description of FIGS. 8 and 9.

The spool 142 is driven by the user via a drive plate 160, best shown in FIGS. 2 and 3. The drive plate 160 has a plate free side 162 (shown in FIG. 2) and a spool-engaging side 164 (shown in FIG. 3), with a plate central passage 166 passing through the drive plate 160. The plate free side 162 is provided with a plate friction washer 168 surrounding the plate central passage 166. The plate friction washer 168 preferably has a composition similar to that of the flange friction washer 140. The drive plate 160 is preferably configured to substantially cover and be closely spaced from the rim 104 of the reel body 102.

Figures 5, 6:
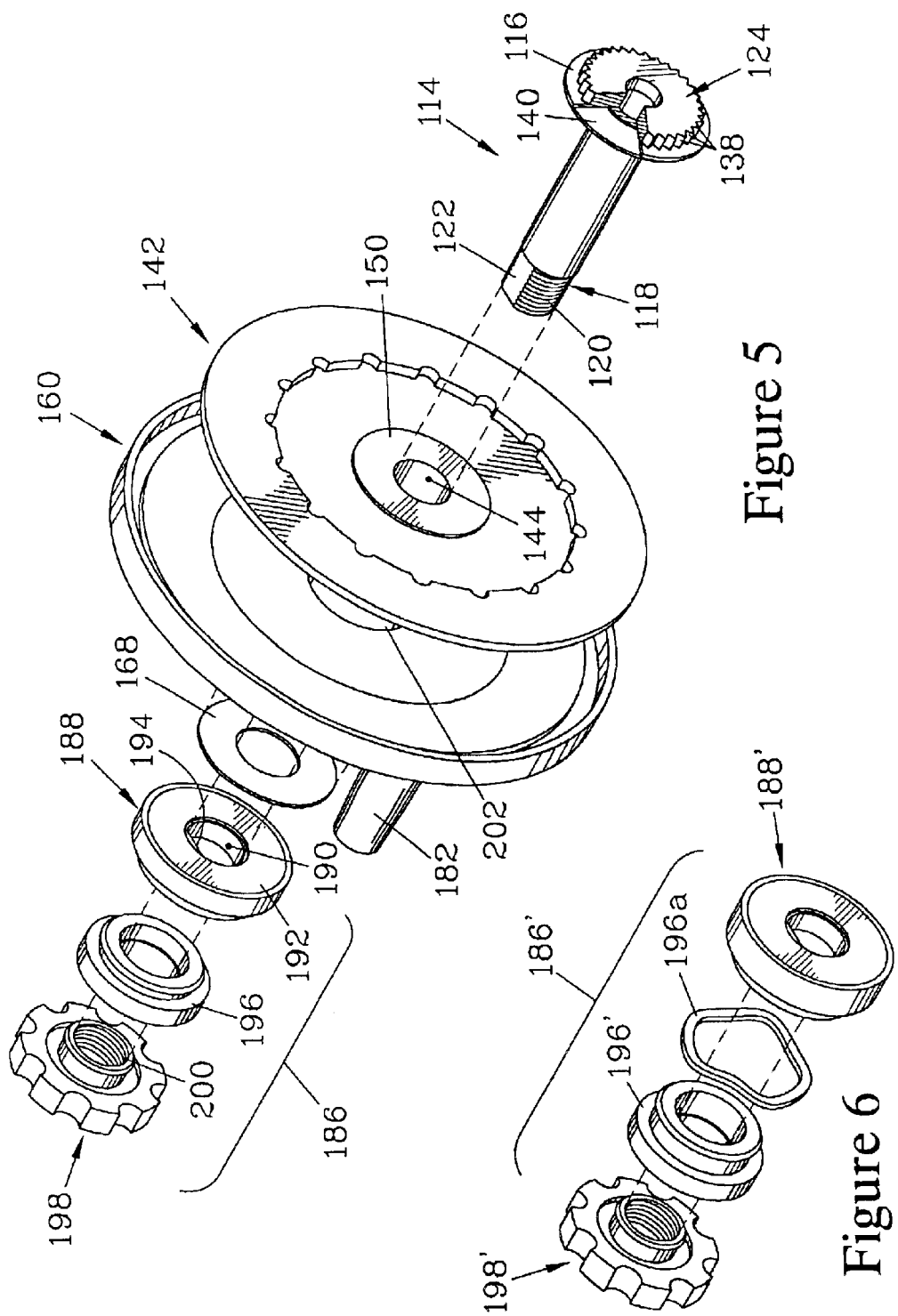
FIG. 5 is a partial view of the embodiment shown in FIGS. 2–4, and provides a partially exploded view of a drag capsule which serves to secure the parts of the fly-fishing reel together as well as to allow a user to adjust the amount of drag.
FIG. 6 is an exploded view of an alternative drag capsule which can be employed in place of the drag capsule shown in FIG. 5.

In order for the drive plate 160 to drive the spool 142, it is necessary to provide a means for lockably engaging the spool 142 with the drive plate 160. In the embodiment illustrated in FIGS. 2 and 3, the means for lockably engaging the spool 142 with the drive plate 160 employs a cylindrical protrusion 170 having a series of ribs 172 radiating therefrom, as shown in FIG. 3. The cylindrical protrusion 170 and the ribs 172 extend from the spool-engaging side 164 and are symmetrically disposed about the plate central passage 166. The cylindrical protrusion 170 and the ribs 172 are slidably engageable with a second end cylindrical recess 174 (shown in FIG. 2) in the spool second end 148 of the spool 142. The second end cylindrical recess 174 has a series of second end grooves 176 extending therefrom and spaced to engage the ribs 172, thereby allowing slidable and lockable engagement of the drive plate 160 with the spool second end 148, the lockable engagement preventing rotation between the spool 142 and the drive plate 160. FIG. 5 shows the spool 142 and the drive plate 160 when engaged. When the spool 142 is designed to be reversed in the reel body 102, the spool first end 146 is provided with a first end cylindrical recess 178 which has a series of first end grooves 180 radiating therefrom, as shown in FIG. 3.

In the embodiment shown in FIGS. 2–5, the drive plate 160 is driven by a winding handle 182 which is attached directly to the drive plate 160. A counterweight 184 (shown in FIG. 2) is provided, and is diametrically opposed to the handle 182 to improve the balance of the drive plate 160 when rotating.

In order for the fly-fishing reel 100 to properly function, it is necessary that the drive plate 160 and the spindle flange 116 compressively load the spool 142 to generate the drag necessary to avoid backlash of the line. This compressive load is provided by a drag capsule 186 which threadably engages the threaded portion 120 of the spindle shaft 114. As the drag capsule 186 is tightened onto the spindle shaft 114, an appropriate load is generated between the drag capsule 186 and the spindle flange 116. This load generates dual drag force on the spool 142 and the drive plate 160 engaged therewith.

FIG. 5 is an exploded isometric view which shows further details of the drag capsule 186. The drag capsule 186 has a drag capsule base 188 having a base passage 190 surrounded by a drag capsule friction surface 192 which is preferably a graphite-impregnated polymer. The passage 190 is configured with a keyway 194 so as to slidably engage the free end 118 of the spindle shaft 114 which has the key 122. When the drag capsule base 188 slidably engages the spindle shaft 114, the key 122 and the keyway 194 prevent rotational motion between the drag capsule base 188 and the spindle shaft 114.

In the drag capsule 186 shown in FIG. 5, a resilient spacer 196 is interposed between the drag capsule base 188 and a drag capsule cap 198. The drag capsule cap 198 has a cap threaded surface 200 configured to threadably engage the threaded portion 120 of the spindle shaft 114. As the drag capsule cap 198 is tightened, the drag capsule friction surface 192 is forcibly engaged with the plate friction washer 168 (shown detached from the drive plate free side 162 in FIG. 5), creating a drag force on the drive plate 160 as it turns, this drag being transmitted to the spool 142 by the lockable engagement of the spool-engaging side 164 of the drive plate 160 with the spool second end 148. The load resulting from the tightening of the drag capsule cap 198 on the spindle shaft 114 is also transferred through the spool 142 and results in the spool first end friction surface 150 forcibly engaging the flange friction washer 140 on the spindle shaft 114 to create a second drag force on the spool 142. With both friction washers (140, 168) bearing equal loads, the spool 142 is provided with a well balanced dual disk drag force.

For ease of assembly and disassembly of the fly-fishing reel 100, it is preferred that the resilient spacer 196 be attached to both the drag capsule base 188 and the drag capsule cap 198 and, when so attached, at least one of the attachments should allow rotation of the resilient spacer 196 with respect to either the drag capsule base 188 or the drag capsule cap 198, to allow the drag capsule cap 198 to be rotated with respect to the drag capsule base 188. It should be appreciated that the drag capsule base 188 and the drag capsule cap 198 could be provided as separate elements, but it is preferred for the drag capsule base 188 and the drag capsule cap 198 to be rotatably connected together to minimize the number of separate elements when the fishing reel 100 is disassembled.

FIG. 6 illustrates one example of an alternative drag capsule 186', which employs a substantially rigid spacer 196' to connect a drag capsule base 188' to a drag capsule cap 198'. To provide a degree of resiliency to provide greater control in setting the desired amount of drag, a wave spring 196a is operably interposed between a portion of the substantially rigid spacer 196' and the drag capsule base 188'.

The embodiment illustrated in FIGS. 2–5 has the spool 142 mounted in a full cage reel body 102, which provides for maximum housing strength but increases the overall weight of the fly-fishing reel 100. The embodiment shown in FIGS. 2 and 3 also has the winding handle 182 directly connected to the drive plate 160, which results in the winding handle 182 spinning whenever the spool 142 spins. Some users find this objectionable when fishing for large fish, since these fish frequently move with a burst of speed that can result in the winding handle 182 rapidly spinning and creating a danger of striking the user as it spins. The embodiment shown in FIGS. 2–5 also employs a small spool arbor 202, which can be useful when heavy line is employed, since it will accommodate more line. However, the small spool arbor 202 results in a smaller mechanical advantage when winding the line, and thus requires faster turning of the winding handle 182 to pull in an equivalent length of line.

Figure 7:
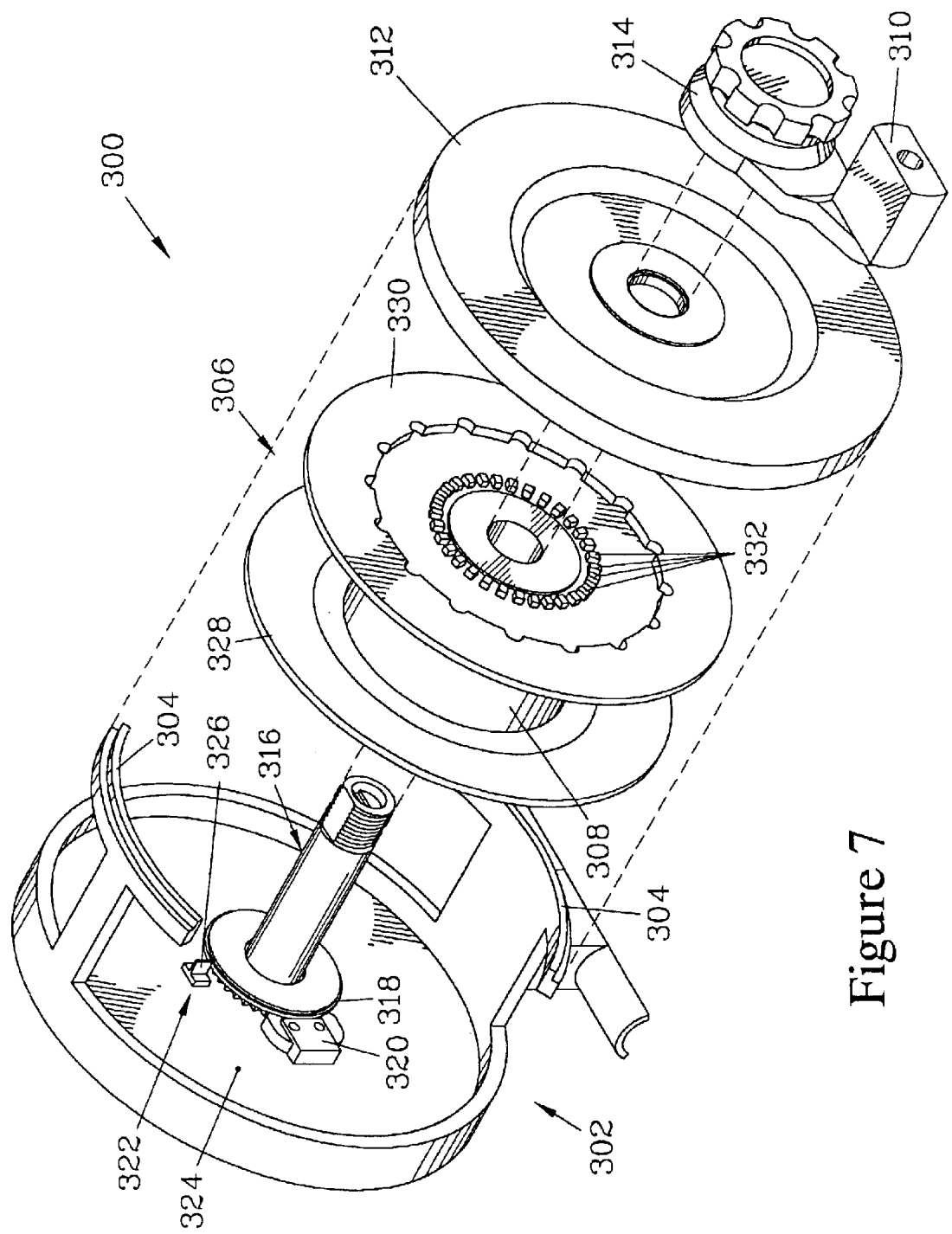
FIG. 7 is an exploded isometric view of a second embodiment of the present invention, shown with the winding handle in the foreground. This embodiment differs from the embodiment illustrated in FIGS. 2–5 in several respects. In this embodiment, the case forms a partial cage for the spool. Also, as illustrated, the reel is fitted with a spool having a large spindle arbor which enhances the ability to rapidly wind in line. The winding handle of this embodiment turns only in the winding direction, thus avoiding spinning of the handle as a fish runs with the line.

FIG. 7 shows an alternate embodiment of the present invention, a fishing reel 300 which employs a reel body 302 having a partial cage configuration to reduce the weight of the reel body 302. The reel body 302 has a pair of rim segments 304 which form part of a circle. The reel 300 illustrated in FIG. 7 has a spool 306 with a large spool arbor 308 which enhances the ability of the user to draw in line after a fish has run. In this embodiment, a winding handle 310 is not attached to a drive plate 312, but rather is affixed to a drag capsule base 314 which does not rotate with respect to a spindle shaft 316 on which the drag capsule base 314 mounts. Thus, the winding handle 310 is connected to the drive plate 312 by frictional engagement between the drag capsule base 314 and the drive plate 312. The winding handle 310 is also connected to the drive plate 312 by the frictional engagement between a spindle flange 318, which is affixed to the spindle shaft 316 and thus rotates with the drag capsule base 314, and the spool 306, which lockably engages the drive plate 312. With the winding handle 310 so connected, the winding handle 310 turns only in the direction in which the spindle shaft 316 rotates, which is the direction the user turns the winding handle 310 to wind line onto the spool 306. The spindle shaft 316 is prevented from turning in the other direction by a pawl mechanism 320, and thus the winding handle 310 is also prevented from turning in the other direction, such as when a fish is running and removing line from the spool 306. Furthermore, if a fish runs while the user is reeling in line, since the winding force is frictionally transmitted to the drive plate 312 and the spool 306, the line will be released and breakage of the line avoided.

It should be noted that a drive plate and drag capsule base such as are employed in the reel 100 discussed above could be readily substituted for the drive plate 312 and drag capsule base 314 to provide a direct-drive mode of operation, where the winding handle turns with the spool in both directions. Thus, by providing supplemental parts, one reel can be quickly configured for either mode of operation without the use of tools.

The embodiment illustrated in FIG. 7 is also provided with a reel clicker 322 mounted on a base plate 324 of the reel body 302. The reel clicker 322 has a tab 326 which is positioned to ride over a first series of radial ridges (not shown) provided on a spool first end 328 which faces the reel clicker 322. In this embodiment, the spool 306 is reversible and thus a spool second end 330 is provided with a second series of radial ridges 332, which are identical to the first series of radial ridges. As the tab 326 of the reel clicker 322 snaps across the radial ridges, it vibrates, the frequency vibration being proportional to the rotational speed of the spool 306. Thus, when a fish strikes a fly on the line and runs with the line, the user is notified that the fly has been taken by the vibration noises of the reel clicker 322.

FIG. 8 is an exploded isometric view of another embodiment of the present invention, a spool 400 that is suitable for use with a reel such as the reel 300 discussed above. The spool 400 as illustrated has a small arbor 402, however the spool 400 could also be constructed with a large arbor. The spool 400 has spool ends 404 which employ replaceable spool end friction surfaces 406. The spool ends 404 are provided with a series of symmetrically disposed protrusions 408 which are disposed about a spool passage 410. The replaceable spool end friction surfaces 406 in turn have a series of peripheral notches 412 positioned to grippably engage the protrusions 408 on the spool ends.

Having the spool end friction surfaces 406 fabricated from sheet stock and designed for replacement provides multiple benefits over the hat-shaped combination disks 154 and sleeves 156 discussed earlier and shown in FIG. 4. The use of the spool end friction surfaces 406 facilitates repair of the spool 400 due to wear, and simplifies manufacturing since sheet stock can be employed for the end friction surfaces 406 and they can be attached to the spool ends 404 without fasteners. Additionally, the preferred material for the spool end friction surfaces 406 is subject to swelling when immersed in salt water, and thus the replaceable spool end friction surfaces 406 can be provided with friction surface passages 414 that are made oversized to avoid binding on a spindle shaft which passes therethrough. A separate bearing sleeve 416 can be employed to provide the spool passage 410. The bearing sleeve 416 can be fabricated from a more stable material so as not to bind if the reel is dropped in salt water. There is also a secondary benefit in that, not only is the machining simplified, thereby limiting fabrication costs, but also the preferred materials for the bearing sleeve 416 are less expensive than those preferred for the spool end friction surfaces 406, resulting in an additional savings. FIG. 9 is a partial view of the section 9—9 of FIG. 8 and illustrates how the bearing sleeve 416 is installed when the spool 400 is assembled. The bearing sleeve 416 is maintained in place by the spool end friction surfaces 406, which in turn are frictionally engaged with the protrusions 408. With this design, because of the positioning of the protrusions 408, they can also serve to activate a clicker in the same manner as the radial ridges 332 discussed above.

FIG. 10 is an exploded isometric view that illustrates a preferred structure for attaching a flange friction washer assembly 500 to a spindle flange 502 of a spindle shaft 504. A similar assembly can be employed to attach a plate friction washer to a drive plate. In this embodiment, the spindle flange 502 has a number of slots 506 passing therethrough. A flange friction washer 508 is affixed to a friction washer mounting ring 510, such as by use of adhesive. The friction washer mounting ring 510 is cut from thin metal sheet stock and includes a number of tabs 512 which can be stamped or cut into the material of the friction washer mounting ring 510 and then bent so that they project substantially normal to the friction washer mounting ring 510. The tabs 512, when so configured, can pass through the slots 506 of the spindle flange 502. Thereafter, the tabs 512 are bent to secure the flange friction washer 508 and the friction washer mounting ring 510 to the spindle flange 502. If replacement of the flange friction washer 508 is desired, the tabs 512 can be bent to allow the friction washer assembly 500 to be separated from the spindle flange 502 and replaced.

Figure 11:
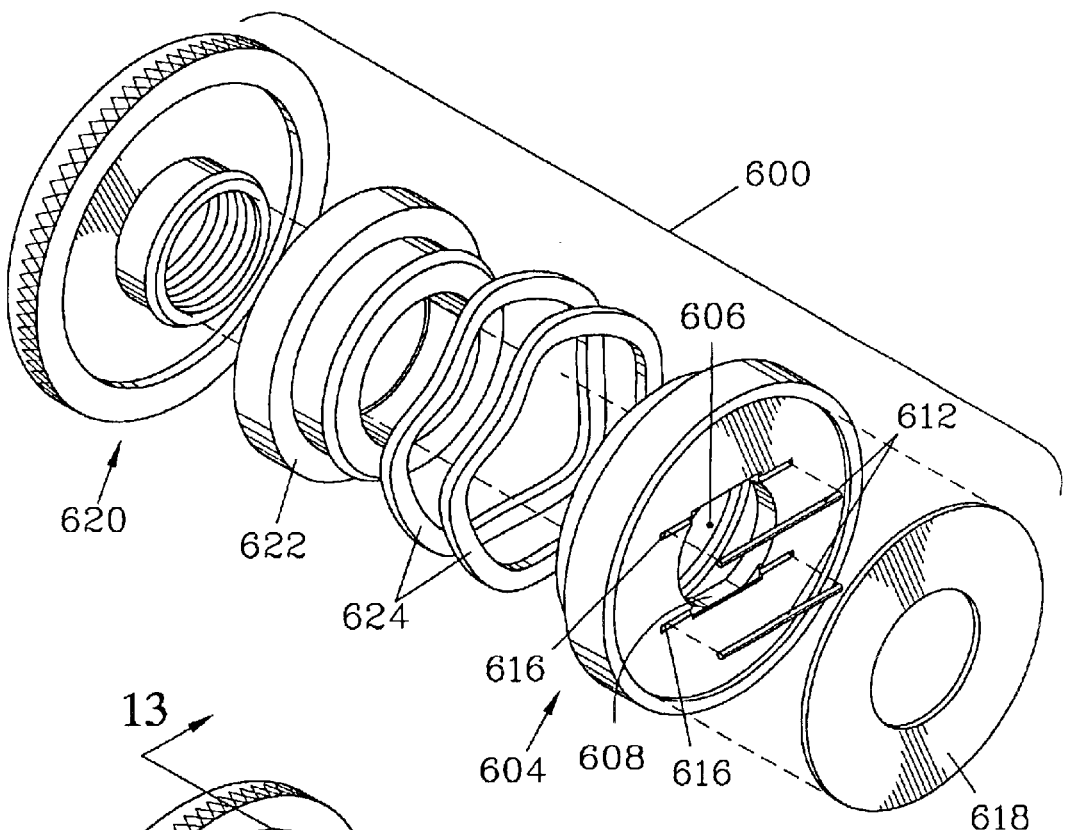
FIG. 11 is an exploded isometric view of a drag capsule which is designed to snappably engage a spindle shaft prior to threadably engaging the spindle shaft and snappably disengage after the drag capsule has theadably disengaged from the spindle shaft. In the embodiment illustrated, the drag capsule has two springs that provide a detent for engaging the spindle shaft free end. The drag capsule is also provided with a profile that improves comfort for the user.
Figure 12:
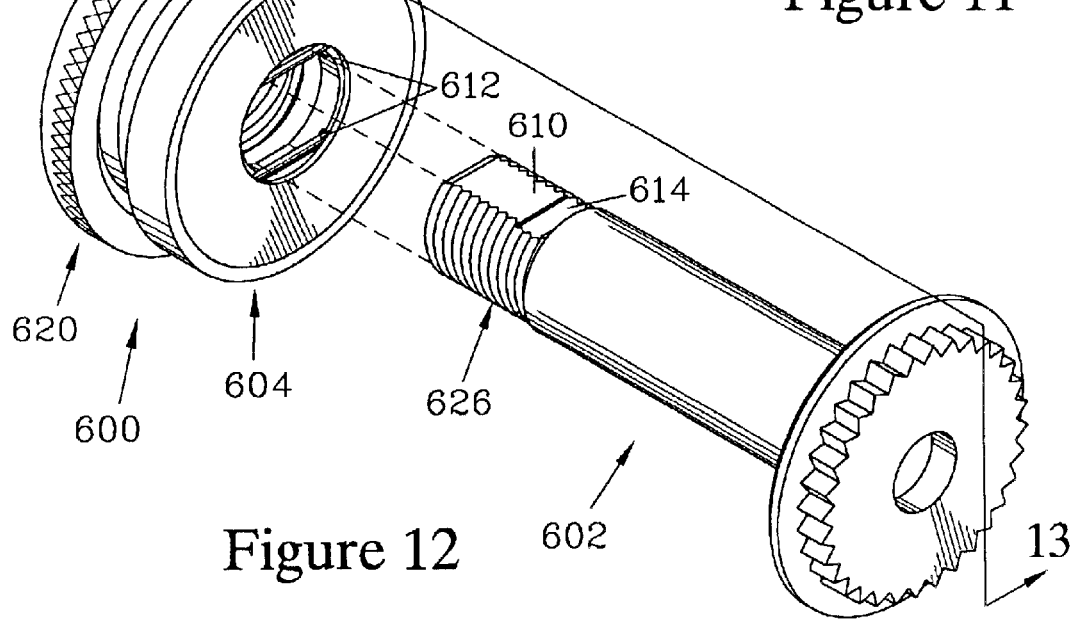
FIG. 12 is an isometric view of the drag capsule shown in FIG. 11 which has been assembled and is positioned to be brought into sliding contact with a spindle shaft onto which the drag capsule is designed to snap.
Figure 13:
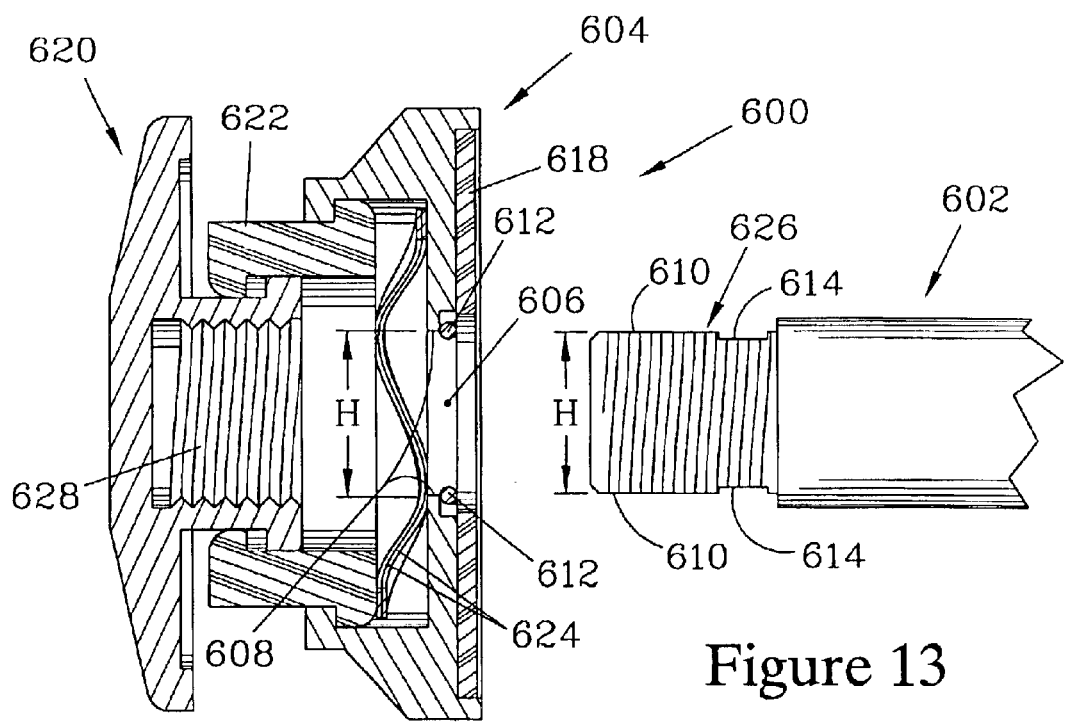
FIG. 13 is a partial view of the section 13—13 of FIG. 12.
Figure 14:
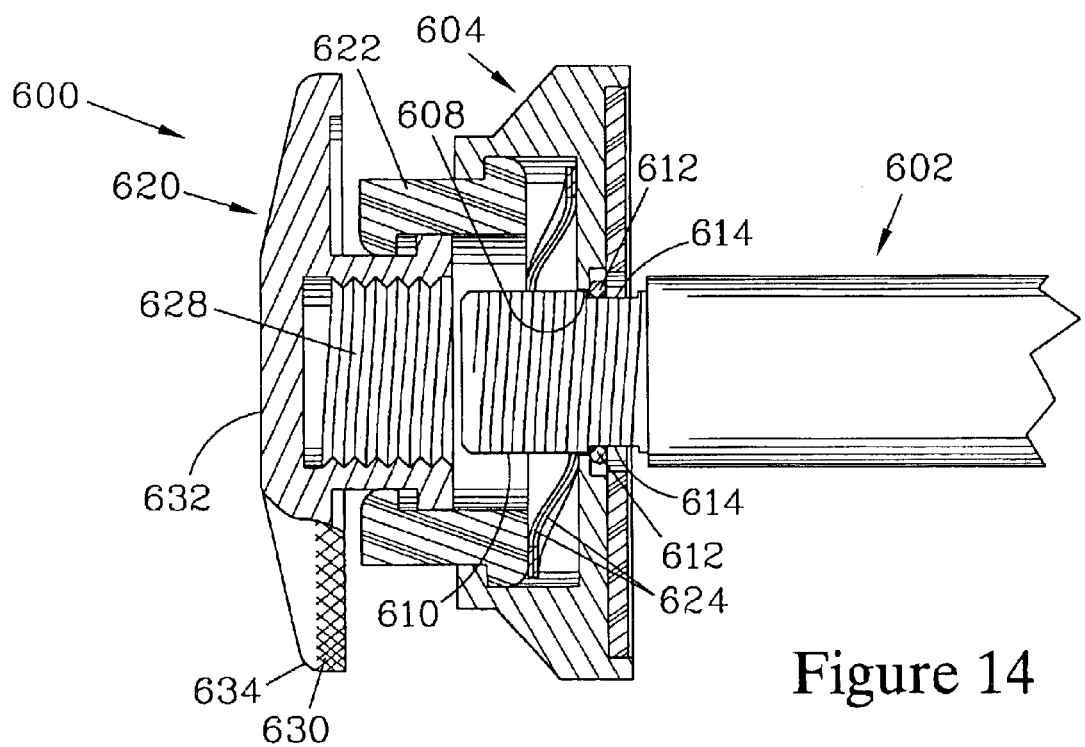
FIG. 14 is a partial cross section corresponding to the view of FIG. 13, but where the drag capsule has been snapped onto the spindle shaft but not threadably engaged therewith.

FIGS. 11 through 14 illustrate a further preferred embodiment of a drag capsule 600, which remains snapped onto a spindle shaft 602 and the remainder of the reel until positive action is taken by the user to remove it. FIG. 11 is an exploded isometric view illustrating the elements which form the drag capsule 600, while FIG. 12 is an isometric view illustrating the assembled drag capsule 600 and the associated spindle shaft 602. FIG. 13 is a section view showing the drag capsule 600 positioned for placement onto the spindle shaft 602, prior to engagement, while FIG. 14 shows the drag capsule 600 after it has been snapped into engagement with the spindle shaft 602, but prior to threadable engagement of the drag capsule 600 with the spindle shaft 602.

As shown in FIG. 11, the drag capsule 600 has a drag capsule base 604 with a drag capsule passage 606 having a pair opposed keyway surfaces 608. As shown in FIGS. 13 and 14, the keyway surfaces 608 are positioned with a separation H therebetween and are designed to slidably engage a pair of keys 610 on the spindle shaft 602 to prevent rotation between the drag capsule base 604 and the spindle shaft 602.

Retention springs 612 are provided, which parallel the keyway surfaces 608 but are spaced apart at a lesser separation so as to snappably engage spring securing grooves 614 in the keys 610. The retaining springs 612 in combination with the spring securing grooves 614 provide detents to retain the drag capsule 600 engaged with the spindle shaft 602. It should be appreciated by those skilled in the art that alternative detents could be employed. The retention springs 612 employed in this embodiment are preferably formed by wire springs and reside in spring recesses 616. The retention springs 612 are retained in the spring recesses 616 by a friction disk 618 that is attached to the drag capsule base 604 to provide a drag capsule friction surface. The drag capsule 600 also has a drag capsule cap 620, which is mounted to the drag capsule base 604 by a substantially rigid spacer 622. The substantially rigid spacer 622 slidably engages the drag capsule base 604, and is biased with respect thereto by a stacked pair of wave springs 624 that are interposed between the substantially rigid spacer 622 and the drag capsule base 604. The substantially rigid spacer 622 also slidably engages the drag capsule cap 620 and is configured to snappably attach to both the drag capsule base 604 and the drag capsule cap 620, serving to connect these elements together.

FIGS. 13–14 illustrate the interaction of the drag capsule 600 and the spindle shaft 602. In FIG. 13, the spindle shaft 602 has its pair of keys 610 positioned with respect to the drag capsule 600 so that these elements are ready for assembly. The keys 610 are formed by flat surfaces that interrupt male screw threads of a threaded portion 626 of the spindle shaft 602. The keys 610, each with its spring-retaining notch 614, are positioned parallel to the key surfaces 608 of the drag capsule base 604. When the drag capsule passage 606 is placed over the spindle shaft 602, the retention springs 612 slidably engage the keys 610 and are forced aside. When the spindle shaft 602 has been inserted into the drag capsule passage 606 sufficiently far that the retention springs 612 reach the spring-retaining notches 614, the retention springs 612 return substantially to their rest positions, as shown in FIG. 14. From this position, pulling the drag capsule 600 off the spindle shaft 602 requires the retention springs 612 to again be forced aside by the keys 610, and thus the drag capsule 600 is retained on the spindle shaft 602 until removed by the user. This both reduces the risk of inadvertently dropping the drag capsule 600, and also facilitates proper threading of a drag capsule threaded surface 628 onto the threaded section 626 of the spindle shaft 602, since the threads are already substantially aligned.

FIG. 14 also shows a preferred contour of the drag capsule cap 620. The drag capsule cap 620 is provided with a knurled rim 630 which is separated from a cap end region 632 by a cap curved portion 634. The cap curved portion 634 serves to space the knurled rim 630 from the end region 632, eliminating sharp edges which might accidentally be contacted by the hand of the user while operating the reel. The knurled rim 630 still allows the user to readily apply torque to thread the drag capsule threaded surface 628 of the drag capsule cap 620 onto the spindle shaft 602.

While the novel features of the present invention have been described in terms of particular embodiments and preferred applications, it should be appreciated by one skilled in the art that substitution of materials and modification of details obviously can be made without departing from the spirit of the invention.

What I claim is:

1. A fishing reel for attachment to a fishing pole for holding, dispensing, and retrieving a fishing line, the fishing reel comprising:
    a reel body for mounting to the fishing pole and having a base plate with a centrally mounted reel arbor extending therefrom;
    a spindle shaft terminating in a spindle flange and a free end, said spindle shaft rotatably engaging said reel arbor;
    a gear fixably attached to said spindle flange and axially aligned with said spindle shaft;
    a pawl assembly mounted to said base plate, said pawl assembly positioned to operably engage said gear to allow rotation of said spindle shaft in a first direction while preventing rotation of said spindle shaft in a second direction opposite said first direction;
    a flange friction washer surrounding said spindle shaft and fixably attached with respect to said spindle flange;
    a spool for holding the fishing line, said spool having a spool central passage therethrough, at least a portion of which is configured to be slidably and rotatably mounted with respect to said spindle shaft, said spool terminating in a spool first end and a spool second end, said spool first end having a spool first end friction surface surrounding said spool central passage for engagement with said flange friction washer;
    a drive plate having a plate free side and a spool-engaging side, said drive plate having a plate central passage through which said spindle shaft passes, said spool-engaging side engaging said spool and said plate free side being provided with a plate friction washer surrounding said plate central passage;
    means for lockably engaging said drive plate with said spool, thereby preventing rotation therebetween;
    a drag capsule having,
        a drag capsule base with a drag capsule base passage therethrough surrounded by a drag capsule friction surface, and said drag capsule base passage being configured for adjustably engaging said free end of said spindle shaft,
        means for advancing said drag capsule base on said spindle shaft so as to forcibly engage said drag capsule friction surface with said plate friction washer, and
        means for affixing said drag capsule to said spindle shaft so as to maintain said drag capsule friction surface in forced engagement with said plate friction washer, thereby providing frictional resistance while allowing rotational motion between said drag capsule friction surface and said plate friction washer; and
    a winding handle operably connected to said drive plate to allow a user to rotate said drive plate and said spool.

2. The fishing reel of claim 1 wherein said free end of said spindle shaft has a threaded portion, and
    further wherein said drag capsule base passage is threaded for engaging said threaded portion of said free end so as to provide said means for advancing said drag capsule base on said spindle shaft to so as to forcibly engage said drag capsule friction surface with said plate friction washer, and
    still further wherein said drag capsule further comprises:
        a threaded lock nut which serves as said means for affixing said drag capsule to said spindle shaft so as to maintain said drag capsule friction surface in forced engagement with said plate friction washer.

3. The fishing reel of claim 1 wherein said free end of said spindle shaft has a threaded portion and at least one key formed thereon,
    further wherein said drag capsule passage is configured to slidably engage said free end of said spindle shaft and has at least one keyway for engagement with said at least one key to prevent rotation of said drag capsule base with respect to said threaded portion of said spindle shaft when slidably engaged therewith, and
    said drag capsule further comprising:
        a drag capsule cap having a cap threaded surface configured to threadably engage said threaded portion of said spindle shaft to allow said drag capsule base to bring said drag capsule friction surface into forced contact with said plate friction washer thereby serving as said means for advancing said drag capsule base on said spindle shaft so as to forcibly engage said drag capsule friction surface with said plate friction washer.

4. The fishing reel of claim 3 further comprising:
    a spacer attached to said drag capsule base and to said drag capsule cap so as to be rotatably attached to at least one of said drag capsule base and said drag capsule cap.

5. The fishing reel of claim 4 further comprising:
    means for snappably engaging said spindle shaft with said drag capsule base in advance of threadable engagement between said cap threaded surface and said spindle shaft.

6. The fishing reel of claim 4 wherein the reel is convertible between a left-hand operated reel and a right-hand operated reel, further wherein said means for lockably engaging said drive plate with said spool allows selectively lockably engaging said drive plate with either of said spool first end and said spool second end, the fishing reel further comprising:
    means for selectively positioning said pawl assembly between a first pawl assembly position, where said pawl assembly allows rotation of said spindle shaft in said first direction but prevents rotation of said spindle shaft in said second and opposite direction, and a second pawl assembly position, which allows rotation of said spindle shaft in said second direction while preventing rotation in said first direction; and
    a spool second end friction surface surrounding said spool central passage at said spool second end for alternate engagement with said flange friction washer.

7. The fishing reel of claim 4 wherein said winding handle is mounted to said drive plate.

8. The fishing reel of claim 4 wherein said winding handle is mounted to said drag capsule base which in turn is frictionally engaged with said drive plate when said drag capsule cap is tightened onto said threaded portion of said spindle shaft.

9. The fishing reel of claim 6 wherein said spool first end friction surface and said spool second end friction surface are fabricated from sheet stock and are configured to respectively grippably engage said spool first end and said spool second end, and further wherein said spool central passage is at least partly provided by a tubular bearing interposed between said spool first end friction surface and said spool second end friction surface.

10. The fishing reel of claim 6 wherein said flange friction washer and said plate friction washer are formed of a soft gripping material, and further wherein said spool first end friction surface, said spool second end friction surface, and said drag capsule friction surface are formed of a self-lubricating material.

11. The fishing reel of claim 10 wherein said spindle flange is provided with flange slots and said flange friction washer is affixed to a flange friction washer mounting ring having tabs which extend through said flange slots, and further wherein said drive plate is provided with plate slots and said plate friction washer is affixed to a plate friction washer mounting ring having tabs which extend through said plate slots.

12. A spool for mounting in a fishing reel to hold a fishing line, the reel having a selectively rotatable spindle shaft with a flange friction washer affixed with respect thereto, and having a drive plate with a spool-engaging side and a winding handle operably connected thereto, the spool comprising:

a spool central passage, at least a portion of which is configured to be slidably and rotatably mounted with respect to the spindle shaft of the reel, a spool first end having a spool first end friction surface surrounding said spool central passage for engagement with the flange friction washer when the spool is mounted onto the spindle shaft with said spool first end friction surface opposed to the flange friction washer, said spool first end being configured to be lockably engageable with the spool-engaging side of the drive plate when the spool is mounted onto the spindle shaft with said spool first end friction surface faces away from the flange friction washer; and a spool second end having a spool second end friction surface surrounding said spool central passage for engagement with the flange friction washer when the spool is mounted onto the spindle shaft with said spool second end friction surface opposed to the flange friction washer, said spool second end being configured to be lockably engageable with the spool-engaging side of the drive plate when the spool is mounted onto the spindle shaft with said spool first end friction surface opposed to the flange friction washer.

13. The spool of claim 12 wherein said spool first end friction surface and said spool second end friction surface are fabricated from sheet stock and are configured to respectively grippably engage said spool first end and said spool second end, and further wherein said spool central passage is fitted with a tubular bearing interposed between said spool first end friction surface and said spool second end friction surface and configured to slidably and rotatably engage the spindle shaft of the reel.

14. The fishing reel of claim 13 wherein said spool first end friction surface and said spool second end friction surface are formed of a self-lubricating material.

* * * * *